United States Patent [19]
DeAnna

[11] Patent Number: 6,039,262
[45] Date of Patent: Mar. 21, 2000

[54] PASSIVE BIMETALLIC ACTUATOR FOR HEAT TRANSFER

[75] Inventor: Russell DeAnna, Westlake, Ohio

[73] Assignee: The United States of America as represented by the Secretary of the Army, Washington, D.C.

[21] Appl. No.: 09/158,164

[22] Filed: Sep. 14, 1998

[51] Int. Cl.[7] .................................................. G05D 23/08
[52] U.S. Cl. ..................................... 236/93 R; 236/101 E
[58] Field of Search .............................. 236/93 R, 101 E

[56] References Cited

U.S. PATENT DOCUMENTS

| | | | |
|---|---|---|---|
| 2,673,687 | 3/1954 | Alban et al. | 236/93 R |
| 2,763,433 | 9/1956 | Hill | 236/93 R |
| 3,895,646 | 7/1975 | Howat | 236/3 R |
| 3,980,103 | 9/1976 | Drzewiecki | 236/93 R |
| 4,245,778 | 1/1981 | Diermayer | 236/93 R |
| 4,441,653 | 4/1984 | Grudich | 236/93 R |

Primary Examiner—William E. Tapolcai
Attorney, Agent, or Firm—Paul S. Clohan, Jr.

[57] ABSTRACT

The invention is a bimetallic actuator for heat-transfer applications where the source of energy is provided by a temperature difference between two reservoirs or the temperature change of the ambient. The actuator requires no external source of power for actuation. The actuator can be made with a separate heating resistor and connected to an external power source for operation in the active mode. The actuator could be a flap, a gate, a valve, or a cooling tunnel used to regulate flow anytime there is temperature difference between two environments or a change in the ambient temperature.

7 Claims, 5 Drawing Sheets

PASSIVE BIMETALLIC ACTUATOR FOR HEAT TRANSFER

RIGHTS OF THE GOVERNMENT

The invention described herein may be manufactured, used and licensed by or for the Government without the payment to me of any royalties thereon.

FIELD OF THE INVENTION

This invention relates to the area of fluid dynamics and heat transfer in systems which involve cooling, heating, or heat exchangers. Included are micromechanical bimetallic valve, cooling, and fluid control devices. The specific area included in this invention encompasses the art of self powered actuators which require no external power supplies for actuation.

DESCRIPTION OF RELATED ART

An article by L. M. Schetky, "Shape-memory alloy," Scientific American, 241 (November 1979) mentions using shape-memory alloy materials to make a lever which could be used to automatically open a window, on a greenhouse, for example, when the local temperature rose above a set level. This is a similar concept which uses shape-memory alloys (SMA) instead of bimetallics. This article doesn't mention SMA valves for cooling, nor does it mention bimetallic actuators for heat transfer applications.

All available issues of the "Journal of MicroMechanics and Microengineering" and "Journal of Micromechanical Systems" were investigated without finding any concept which uses bimetallic actuators for heat-transfer applications.

Previous reported work with bimetallic microactuators reports on valves which depend on an external energy source for actuation. Other reported microvalves use electromagnetic, electrostatic, or thermo-pnuematic actuation.

A literature search was conducted and no references to bimetallic actuators used in coolong, heating, or heat exchanger applications were found.

U.S. Pat. No. 5,014,680 to Siemer, for "Self-Powered Automatic Secondary Air Controllers For Woodstoves And Small Furnaces" mentions on column 3, line 22 et seq, that a bimetallic spring becomes more tightly or more loosely coiled, in response to temperature increases or decreases; however this is not related to micromechanical devices as in the present invention, nor is it used for cooling.

The present invention avoids all of these complications since it uses the energy available from the temperature gradient between two environments. Whenever an application arises where two reservoirs of fluid at different temperature are mixed or used to cool or heat, the passive, bimetallic actuator can be used. The advantages with this passive actuator lie with its simplicity, low cost, and freedom from external power.

SUMMARY OF THE INVENTION

The present invention involves a bimetallic actuator which can be used as a valve to modulate the flow between a coolant and a hot stream or the flow of a single fluid. The valve includes bimetallic flaps which respond to the temperature difference between hot and cold streams or a change in temperature of a single fluid. In the present invention if the temperature increases above the operating temperature the flaps bend increasing the gap between flaps and more fluid can flow through the valve; correspondingly, if the temperature decreases below the operating point, the flaps bend more in the opposite direction. For some cooling applications, film cooling for example, the valve does not have to completely shut off the fluid flow. Depending on the manufacturing process, the natural state of the flaps may not be flat and may be bent up or down.

DETAILED DESCRIPTION OF THE INVENTION

Figure 1:
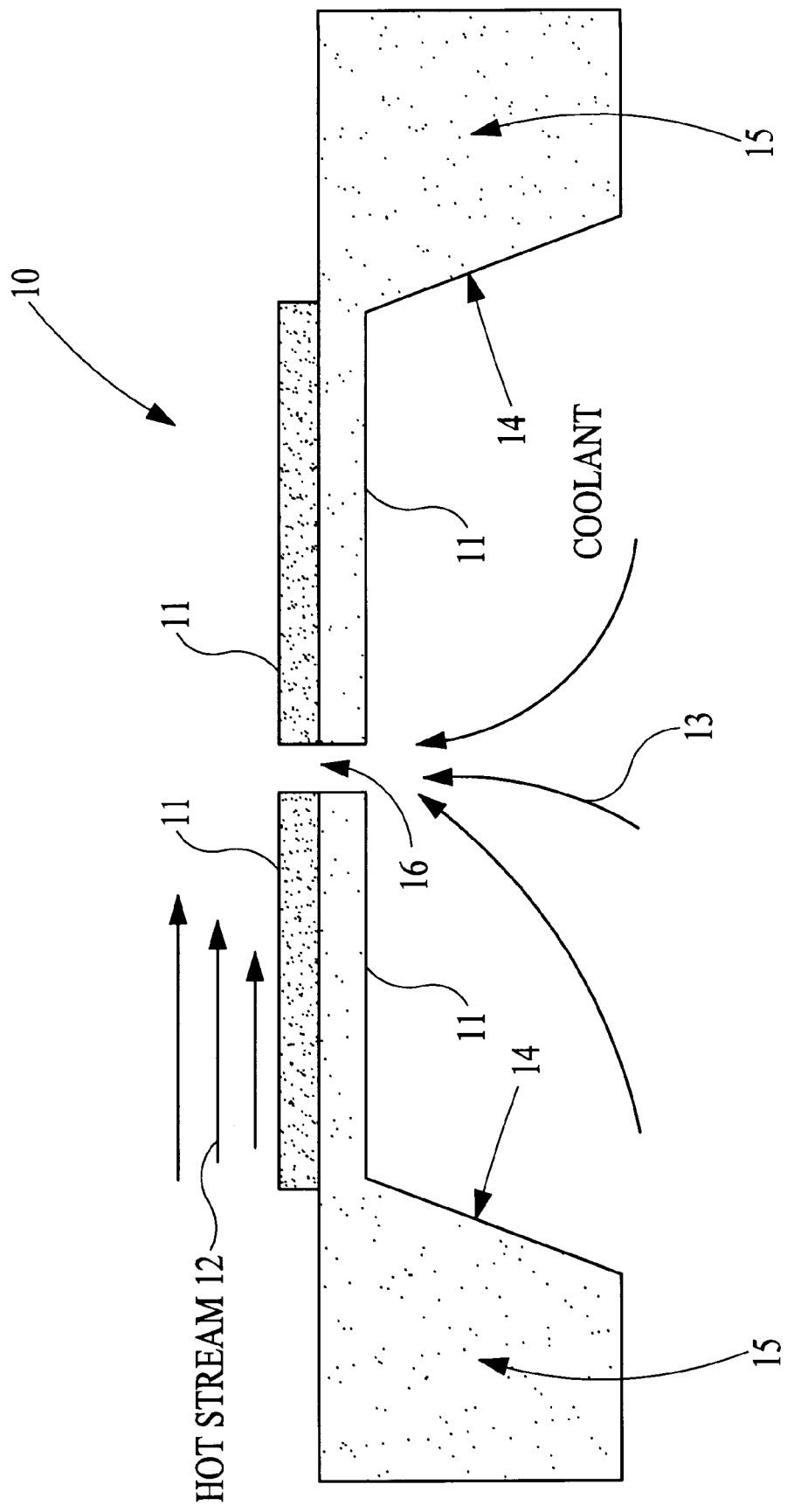
FIG. 1 shows an example of a bimetallic actuator.
Figure 2:
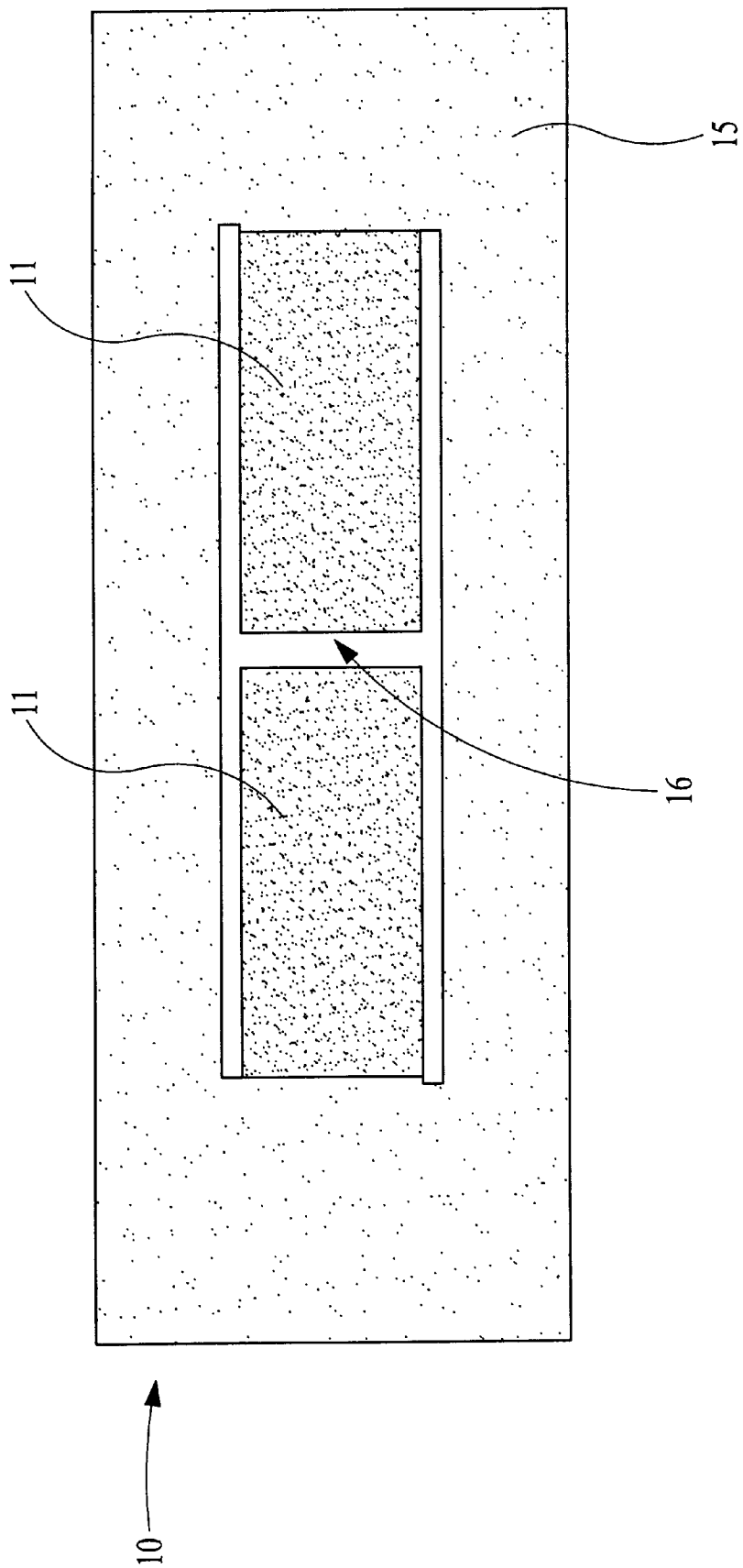
FIG. 2 is a top view of FIG. 1.
Figure 3:
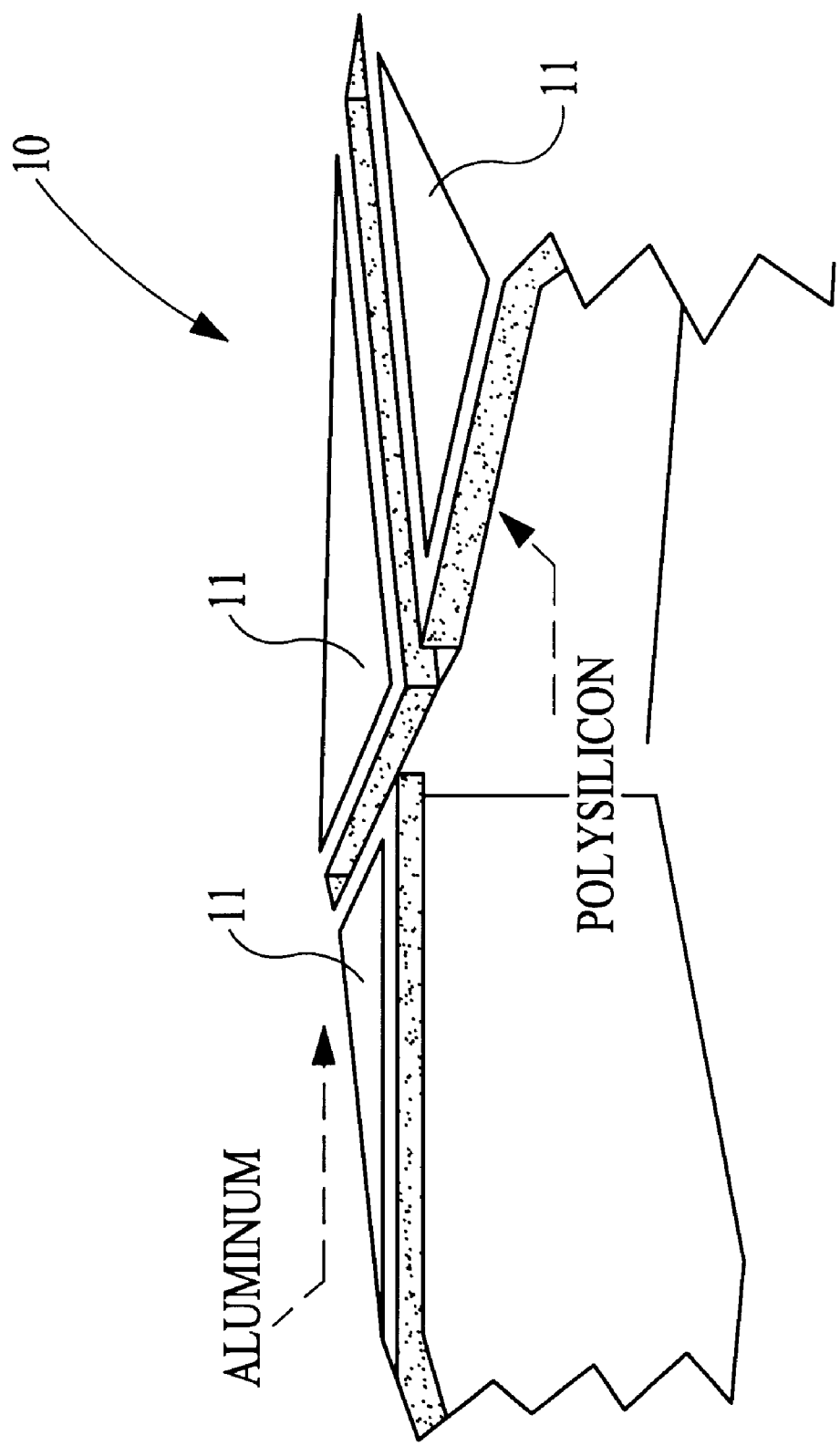
FIG. 3 shows a cross-section of a four flap valve unactuated.
Figure 4:
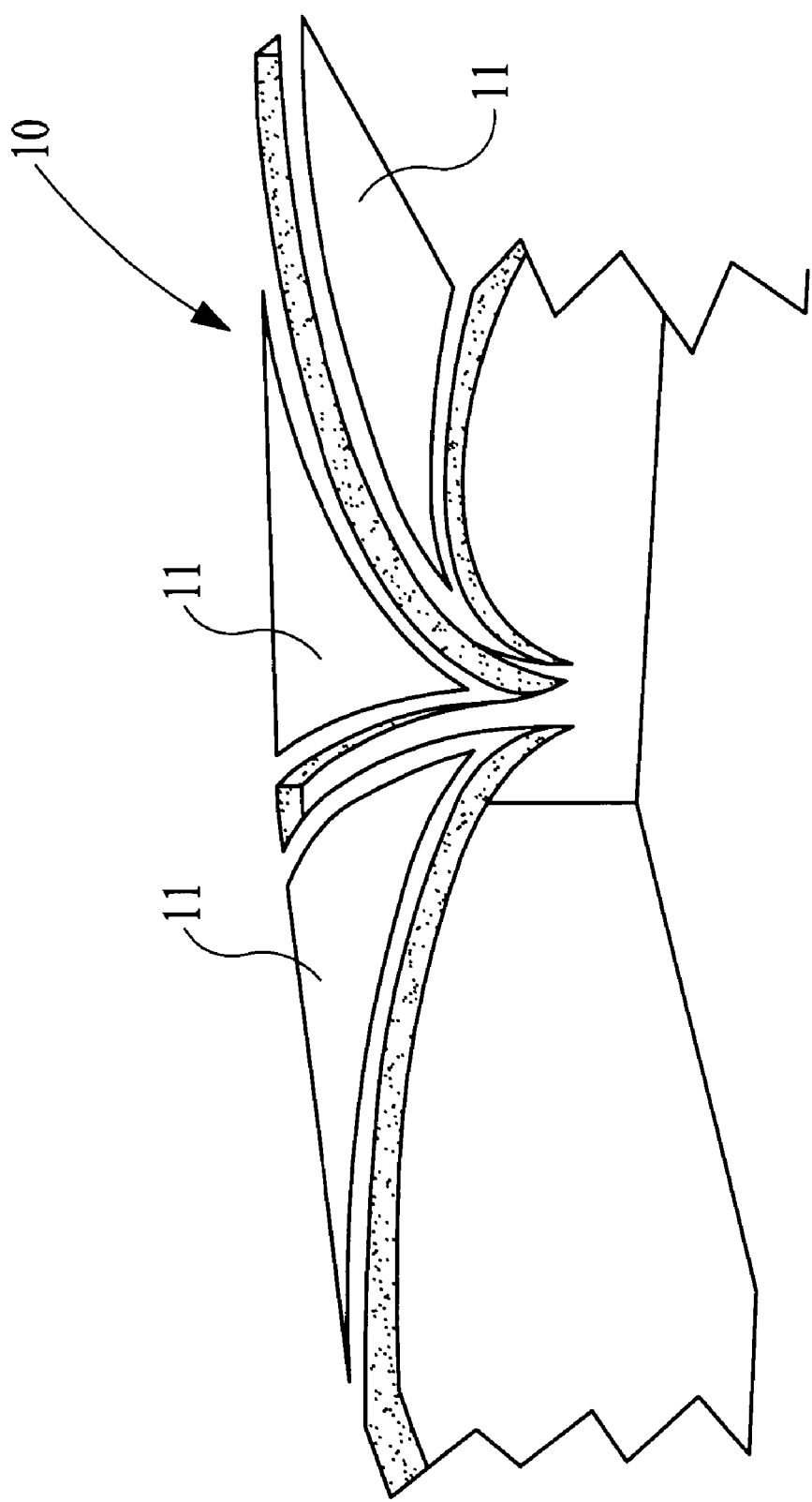
FIG. 4 shows a cross-section of a four flap valve actuated.
Figure 5:
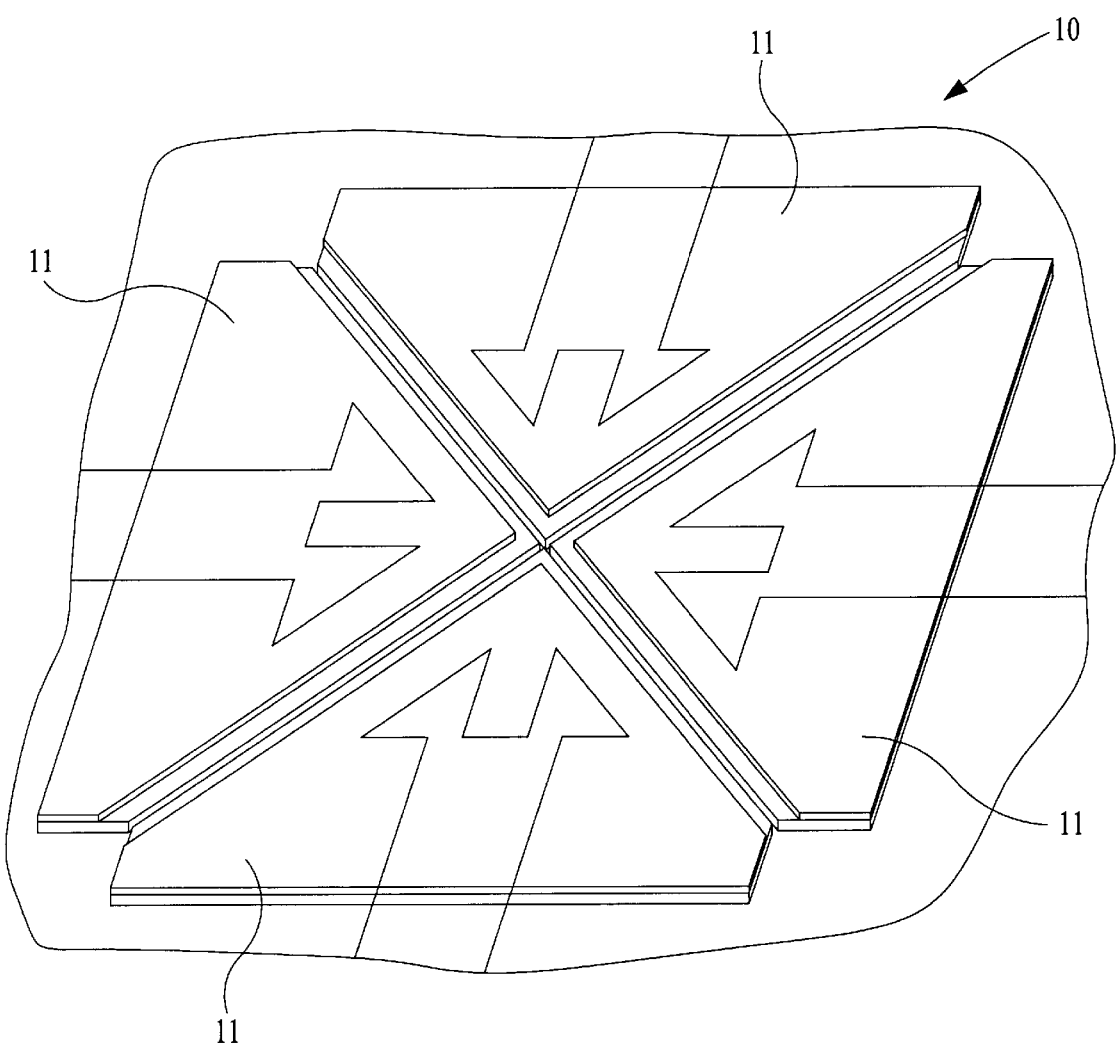
FIG. 5 shows the microfeatures of a four flap valve.

FIG. 1 shows an example of a bimetallic actuator which can be used as a valve to modulate the flow between a coolant and hot stream or to modulate the flow of a single stream as a function of fluid temperature. The valve 10 has bimetallic flaps 11 which respond to the temperature difference between a hot stream 12 and coolant 13 or the ambient temperature. If the ambient temperature or the temperature of hot stream 12 increases above the operating temperature, the flaps 11 bend down more and more fluid or coolant 13 can flow through the valve or actuator 10. If the temperature of the hot stream 12 decreases below the operating temperature, the flaps 11 bend in the opposite direction. For film-cooling applications, the valve 10 does not have to completely shut off the flow of the coolant 13. The design of a valve 10 for a specific application will entail an examination of different flap 11 geometries, numbers, and sizes. For example, the valve shown 10 may simply be constructed from one flap, or alternatively from four flaps (as shown in FIGS. 4 and 5), with a different geometry understood. Another type of valve or actuator could use a bimetallic strip attached to a diaphragm which closes a port completely.

The bimetallic actuators 10 are fabricated by silicon bulk micromachining of a silicon (100 crystal) wafer. In the case of the valve 10, shown in FIG. 1, the slanted walls 14, leading to the cantilever flaps 11, are the crystal planes 111(not a drawing reference numeral), used to control the planar geometry of the etched window accurately. These planes 14 have an angle of 54.7 degrees with respect to the crystal planes 100(not a drawing reference numeral), and limit the packing density of the valves 10 in an array. The silicon component 15, of the cantilever flaps 11, may be fabricated by using a p+ etch stop technique, where the silicon is heavily doped with boron. The gaps 16 separating the flaps 11 from each other and from the substrate 15 are required by the design and lead to a finite flow of coolant 13 when the flaps 11 are perfectly flat. It is possible that these gaps can be as small as a micrometer.

A larger actuator 10 could be made using conventional machining techniques. In the valve 10 example, a boss could be machined around each flap 11 to seal the valve 10 and stop all flow when the valve is completely closed. The valve 10 would then operate similar to a conventional high-pressure bleed valve which opens when the local pressure exceeds some design limit.

The actuators could be used to regulate flow anytime there is temperature difference between two environments or to regulate flow of a single fluid when the ambient temperature changes. Possible applications include heat exchangers, IC cooling, and film cooling of turbine blades. The bimetallic actuators for heat-transfer applications can be used to improve the efficiency of current systems. The actuators require no external source of power or control but they can be made with a heating resistor and powered by an external source in an active mode. As valves, they could be used to improve the efficiency of film-cooling systems or to permit more or less cooling of computer chips. As flaps, they could be used to increase the heat-transfer coefficient and promote turbulence in heat exchangers or flow channels by extending from the wall surface above a certain temperature. As gate keepers, they could direct flow along a certain path depending on temperature.

As shown in FIG. 5, the bimetallic valves have been fabricated and tested on a probe station. The fabrication process begins with a silicon wafer 500 micrometers thick. The silicon is bulk etched from the back side to create a hole below the flaps. This etch stops before etching through the wafer because the top of the silicon is doped with boron atoms which acts as an etch stop. The boron doping can give anything from a 1 micrometer to a 10 micrometer thickness flap. This depends on how long the silicon is doped. A 0.1 micrometer thick oxide (insulator) is grown on top of the silicon. A 1 to 2 micrometer thick metal is sputtered on top of the insulator to act as a bimetallic layer. This comprises the valve in the passive mode. In the active mode another oxide layer is grown on top of the metal layer to act as an insulator between the metal layers. Finally, another layer of aluminum is patterned and sputtered on top of the insulator to act as the heating resistor and interconnects. This layer is 0.1 to 0.2 micrometers thick.

The active valves can be connected to a power supply and allows the valves to be operated in the "active" mode. In the active mode, the order of the metal layers is not critical. The heating resistor could be the first layer on top of the silicon flap with the second solid metal layer then located on top of the heating resistor layer. Or the first layer on top of the silicon flap could be solid metal with the heating resistor layer then located on top of this layer.

I claim:

1. A bimetallic actuator for heat-transfer applications comprising:

a silicon wafer further comprising at least two slanting side walls having an angle with respect to the wafer plane, said slanting side walls leading to at least two flexible silicon flaps cantilevered to said silicon wafer, a metallic layer disposed on top of said silicon wafer and said silicon cantilever flaps, said flexible cantilever flaps being interposed between a hot stream and a coolant stream, whereupon said cantilever flaps move when the temperature of said hot stream increases thereby increasing space between said flexible flaps, allowing more coolant to flow from the coolant stream to the hot stream thereby cooling said cantilever flaps allowing said flaps to return to their original position.

2. A bimetallic actuator as in claim 1 wherein said angle with respect to the wafer plane is 54.7 degrees.

3. A bimetallic actuator as in claim 1 wherein said slanting walls angle with respect to the wafer plane is 54.7 degrees.

4. A bimetallic actuator as in claim 1 wherein said silicon wafer is the (100) plane.

5. A bimetallic actuator as in claim 1 wherein said silicon flaps are the (111) plane.

6. A bimetallic actuator as in claim 1 wherein said silicon wafer comprises polysilicon.

7. A bimetallic actuator as in claim 1 wherein said metallic layer comprises aluminum.

* * * * *